US010839492B2

(12) United States Patent
Scott et al.

(10) Patent No.: US 10,839,492 B2
(45) Date of Patent: Nov. 17, 2020

(54) SELECTIVELY REDACTING UNRELATED OBJECTS FROM IMAGES OF A GROUP CAPTURED WITHIN A COVERAGE AREA

(71) Applicant: International Business Machines Corporation, Armonk, NY (US)

(72) Inventors: Debra Scott, Redwood City, CA (US); Christian Eggenberger, Wil (CH); Urs Schollenberger, Zurich (CH); Aaron K. Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/986,900

(22) Filed: May 23, 2018

(65) Prior Publication Data
US 2019/0362473 A1 Nov. 28, 2019

(51) Int. Cl.
*G06T 5/00* (2006.01)
*H04N 5/232* (2006.01)
*H04W 4/02* (2018.01)
*G06T 5/50* (2006.01)

(52) U.S. Cl.
CPC ............... *G06T 5/005* (2013.01); *G06T 5/50* (2013.01); *H04N 5/23238* (2013.01); *H04W 4/02* (2013.01); *G06T 2207/10032* (2013.01); *G06T 2207/20081* (2013.01)

(58) Field of Classification Search
CPC ........................ B64C 2201/127; G06T 5/005
See application file for complete search history.

(56) References Cited

U.S. PATENT DOCUMENTS

| 5,940,139 | A | 8/1999 | Smoot |
| 6,677,969 | B1 | 1/2004 | Hongo |
| 7,483,062 | B2 | 1/2009 | Allman et al. |
| 8,135,612 | B1 | 3/2012 | Scudder |
| 8,311,275 | B1 * | 11/2012 | Berlic ............... G06K 9/00771 348/143 |
| 8,615,111 | B2 | 12/2013 | Garten |
| 9,286,707 | B1 * | 3/2016 | Switkin ............... G06K 9/4652 |
| 9,407,674 | B2 | 8/2016 | Chan |

(Continued)

OTHER PUBLICATIONS

Anonymous, "Method and apparatus to facilitate photographing in crowded tourist attractions with AR techniques," An IP.com Prior Art Database Technical Disclosure, Jan. 24, 2017, 10 pages. https://ip.com/IPCOM/000248948.

(Continued)

*Primary Examiner* — Brian T Pendleton
*Assistant Examiner* — Frank Johnson
(74) *Attorney, Agent, or Firm* — Yee & Associates, P.C.

(57) ABSTRACT

Providing high-quality images of members of a group moving within a coverage area that includes non-group members is provided. A current location of each member of the group is tracked within the coverage area. Images are obtained of the coverage area. Based on the tracked current location of each member of the group within the coverage area, at least one of the non-group members are selectively redacted from the images of the coverage area such that the members of the group are clearly shown in redacted images and privacy rights of the at least one of the non-group members are protected. The selectively redacted images are provided to at least one of the members of the group.

20 Claims, 13 Drawing Sheets

(56) References Cited

U.S. PATENT DOCUMENTS

| | | | |
|---|---|---|---|
| 2005/0129324 A1 | 6/2005 | Lemke | |
| 2006/0061598 A1* | 3/2006 | Mino | G06K 9/00228 345/629 |
| 2007/0263897 A1 | 11/2007 | Ong et al. | |
| 2009/0058862 A1 | 3/2009 | Finn et al. | |
| 2010/0017885 A1* | 1/2010 | Cohen | G06Q 30/0276 726/26 |
| 2011/0103644 A1* | 5/2011 | Garten | G06T 5/005 382/103 |
| 2012/0320237 A1 | 12/2012 | Liu et al. | |
| 2015/0022698 A1 | 1/2015 | Na et al. | |
| 2017/0068424 A1* | 3/2017 | Hong | B64C 39/024 |
| 2017/0075351 A1* | 3/2017 | Liu | B64C 39/024 |
| 2017/0083748 A1* | 3/2017 | Zhou | G06T 7/248 |
| 2017/0220816 A1* | 8/2017 | Matusek | G06F 21/6245 |
| 2017/0289513 A1* | 10/2017 | Sharma | H04N 9/74 |
| 2017/0324893 A1* | 11/2017 | Matsuda | H04N 7/185 |
| 2017/0374636 A1* | 12/2017 | Texier | H04W 76/14 |
| 2018/0158197 A1* | 6/2018 | Dasgupta | G05D 1/0094 |
| 2018/0189971 A1* | 7/2018 | Hildreth | G06T 7/70 |
| 2018/0232580 A1* | 8/2018 | Wolf | H04N 7/183 |
| 2019/0011921 A1* | 1/2019 | Wang | G06K 9/00664 |
| 2019/0206044 A1* | 7/2019 | Marra | B64C 39/024 |

OTHER PUBLICATIONS

Anonymous, "Removing undesirable objects from photos," An IP.com Prior Art Database Technical Disclosure, Dec. 12, 2006, 6 pages. https://ip.com/IPCOM/000143880.

Ge et al., "Vision-based Analysis of Small Groups in Pedestrian Crowds," IEEE Transactions on Pattern Analysis and Machine Intelligence, vol. 34, Issue 5, May 2012, 14 pages.

"Moments in Time," A large-scale dataset for recognizing and understanding action in videos, copyright 2017, Moments, accessed May 9, 2018, 9 pages. http://moments.csail.mit.edu/.

"Indoor Tracking with Infsoft Locater Tags Using LoRa/BLE or UWB Module," infsoft GmbH, copyright 2017, accessed May 9, 2018, 4 pages. https://www.infsoft.com/technology/hardware/infsoft-locator-tags.

Zafari et al., "A Survey of Indoor Localization Systems and Technologies," arXiv:1709.01015v2, [cs.Ni], Mar. 14, 2018, 30 pages. https://arxiv.org/pdf/1709.01015.pdf.

"Technologies for Server-Based Indoor Positioning Compared: Wi-Fi vs. BLE vs. UWB vs. RFID," Jul. 13, 2017, infsoft GmbH, copyright 2017, accessed May 9, 2018, 7 pages. https://www.infsoft.com/blog-en/articleid/188/technologies-for-server-based-indoor-positioning-c.

Pistorius, "People tracking technologies," DeltaHedron, Innovation Insight, No. 3/17, May 2017, 24 pages. http://www.deltahedron.co.uk/wp-content/uploads/2017/05/DeltaHedron-Innovation-Insight_-People-tracking-technologies_No-3-17_May-2017.pdf.

Phlearn, "How to Automatically Remove Objects from Photos in Photoshop," Video Tutorial, copyright 2018, accessed May 22, 2018, 11 pages. https://phlearn.com/tutorial/automatically-remove-objects-photos-photoshop/.

"Takeanumbersystems.com", accessed May 22, 2018, 1 page. http://www.takeanumbersystems.com/.

List of IBM Patents or Applications Treated As Related, 2 pages.

Knight, "The Next Big Step for AI? Understanding Video," Intelligent Machines, MIT Technology Review, Dec. 6, 2017, accessed May 9, 2018, 7 pages. https://www.technologyreview.com/2017/12/06/147253/the-next-big-step-for-ai-understanding-video/.

* cited by examiner

SELECTIVELY REDACTING UNRELATED OBJECTS FROM IMAGES OF A GROUP CAPTURED WITHIN A COVERAGE AREA

BACKGROUND

1. Field

The disclosure relates generally to image processing and more specifically to selectively redacting, based on a tracked current location of each member of a group within a coverage area, at least one of the non-group members from images of the coverage area such that group members are clearly shown in the redacted images.

2. Description of the Related Art

A selfie is a self-portrait photograph or video, typically taken with a smartphone, for example, which may be held in the hand. Selfies are often shared on social media websites. Selfies are for vanity, usually flattering, and are casual in nature. Typically, selfie refers to self-portrait photographs taken with a camera held at arm's length, as opposed to those photographs taken using a timer or remote exposure device. However, a selfie need not just include one person, but may include multiple people as long as the picture is actually being taken by one of the people featured in the photograph.

SUMMARY

According to one illustrative embodiment, a computer-implemented method for providing high-quality images of members of a group moving within a coverage area that includes non-group members is provided. A computer tracks a current location of each member of the group within the coverage area. The computer obtains images of the coverage area. The computer selectively redacts, based on the tracked current location of each member of the group within the coverage area, at least one of the non-group members from the images of the coverage area such that the members of the group are clearly shown in redacted images and privacy rights of the at least one of the non-group members are protected. The computer provides the selectively redacted images to at least one of the members of the group. According to other illustrative embodiments, a computer system and computer program product for providing high-quality images of members of a group moving within a coverage area that includes non-group members are provided.

DETAILED DESCRIPTION

Figure 1:
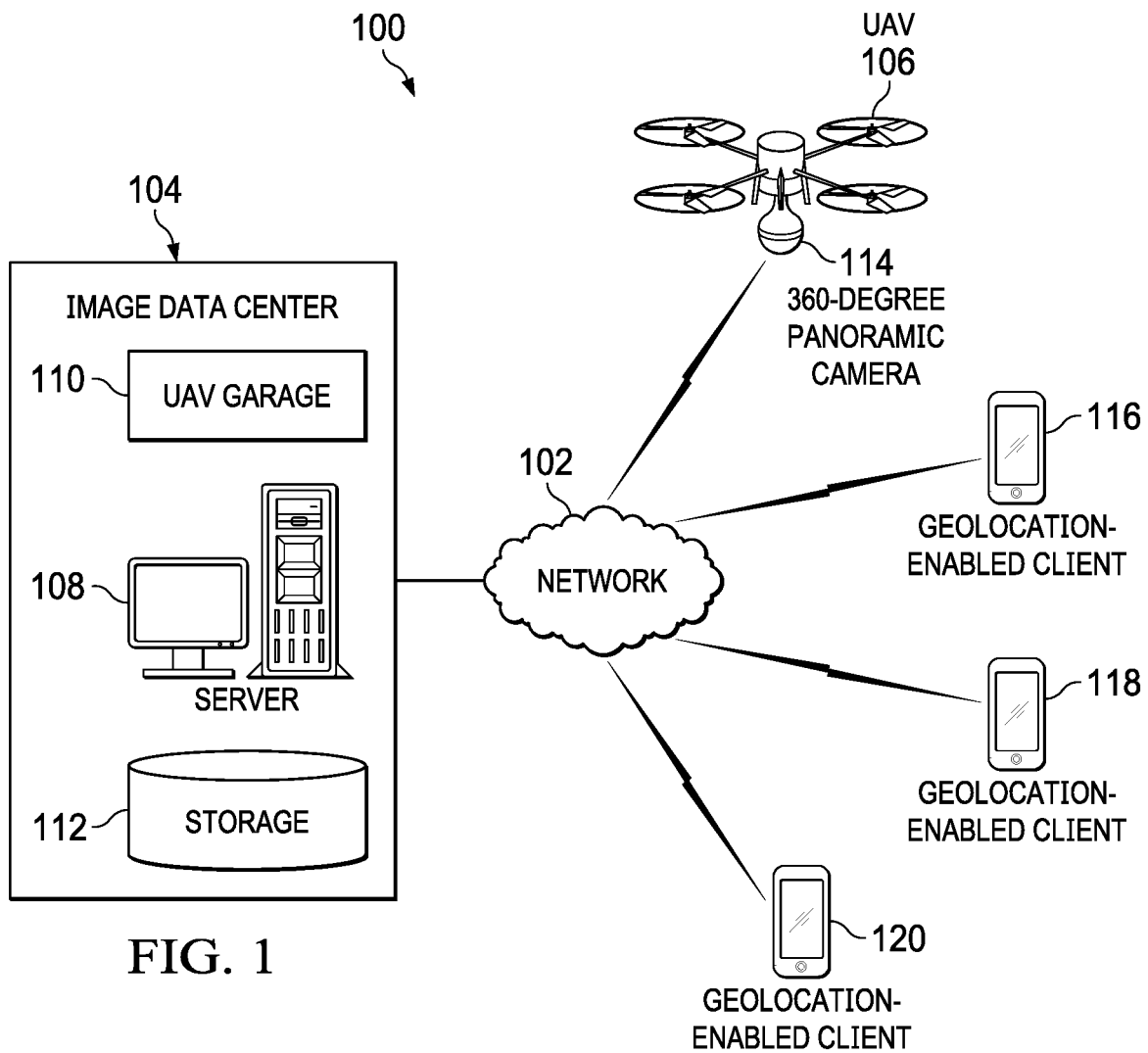
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
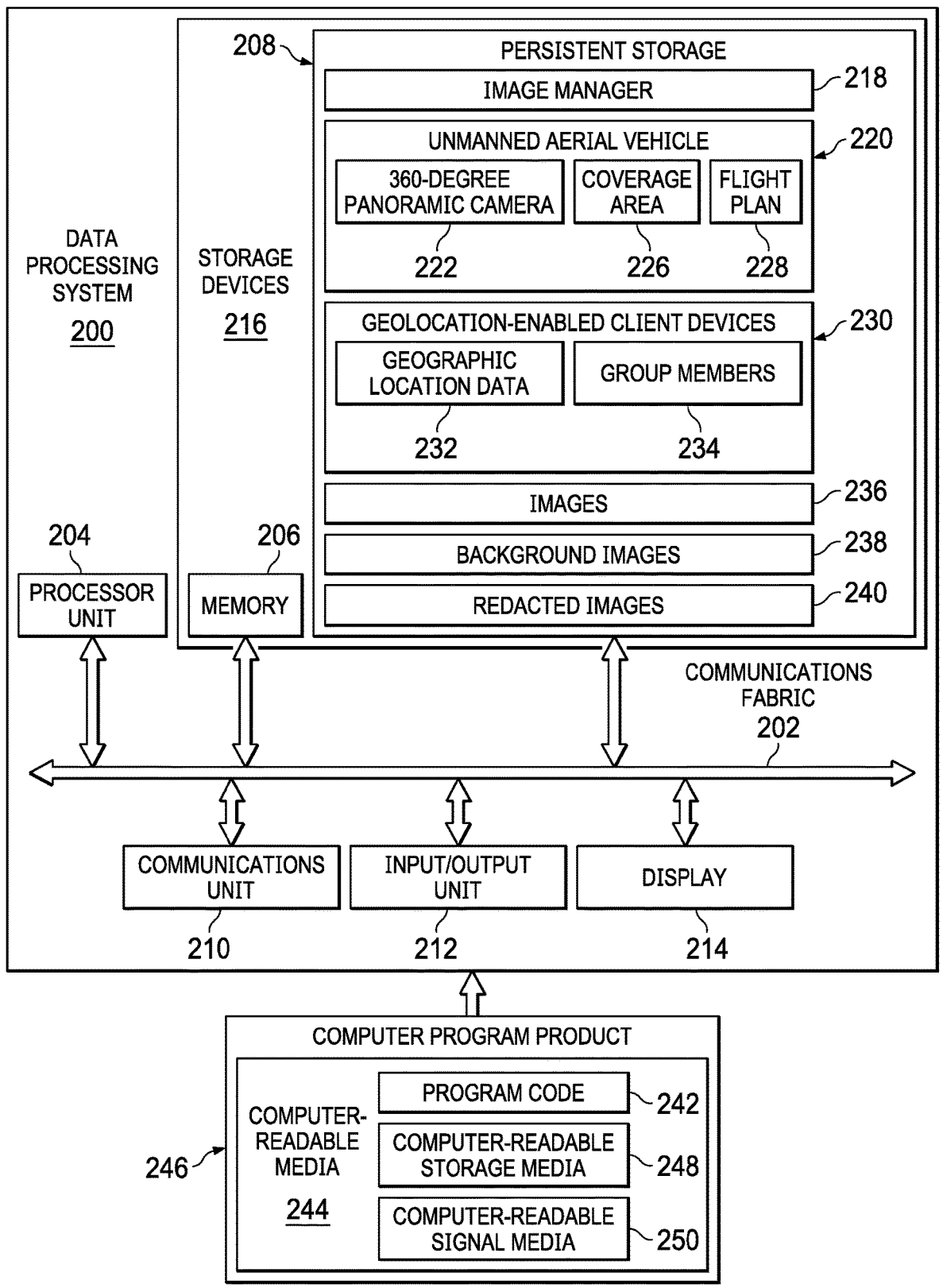
FIG. 2 is a diagram of a data processing system in which illustrative embodiments may be implemented.
Figure 3:
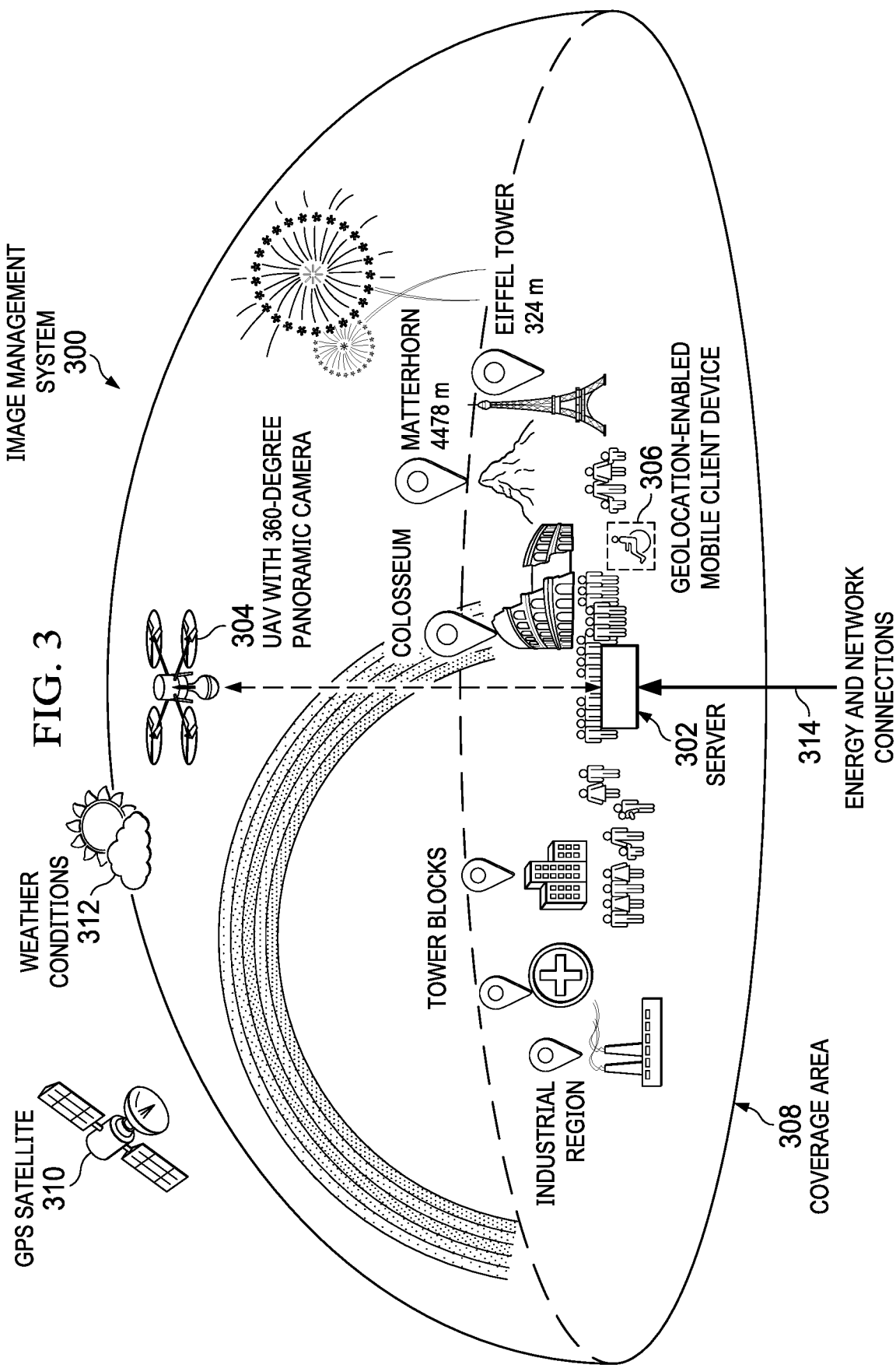
FIG. 3 is a diagram illustrating an example of an image management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected within network data processing system 100. Network 102 may include connections, such as, for example, wire communication links, wireless communication links, and fiber optic cables.

In the depicted example, image data center 104 and Unmanned Aerial Vehicle (UAV) 106 connect to network 102. Image data center 104 includes server 108, UAV garage 110, and storage 112. Server 108 may be, for example, a server computer with high-speed connections to network 102. In addition, server 108 may represent a set of one or more computers. Further, server 108 may be connected to computing nodes in a cloud environment providing one or more services.

Server 108 obtains and processes image data captured by 360-degree panoramic camera 114, which also is connected to network 102. 360-degree panoramic camera 114 is capable of capturing a 360-degree field of view in a plane. Server 108 processes the image data to generate personalized images of people and associated objects by redacting or removing unwanted and unrelated people and objects from the images and replacing or complementing portions of the people and associated objects hidden by the unwanted and unrelated people and objects with stored background images corresponding to the same geographic location. The image data may be black and white image data or color image data and may include still photographs, living photographs, video clips, and the like. 360-degree panoramic camera 114 is mounted on UAV 106 using, for example, a three-dimensional gimbal for camera stabilization to prevent blurring while capturing images. Also, it should be noted that more than one 360-degree panoramic camera may be mounted on UAV 106.

UAV garage 110 represents a structure, housing, or apparatus for storing and recharging UAV 106 when UAV 106 is not in flight. Storage 112 represents a set of one or more network storage devices. Storage 112 may store data in a structured or unstructured format. Further, storage 112 stores pre-recorded, interference-free background images of one or more coverage areas. Interference-free means that the background images do not include any elements, such as, for example, people, animals, vehicles, shadows, litter, advertisements, construction equipment, and the like. The coverage area is the predefined area or space within which 360-degree panoramic camera 114 captures 360-degree panoramic images of people and associated objects.

Geolocation-enabled client 116, geolocation-enabled client 118, and geolocation-enabled client 120 also connect to network 102. Geolocation-enabled clients 116, 118, and 120 are registered clients of server 108. Geolocation-enabled means that server 108 is able to track the indoor and outdoor real-time geographic location of geolocation-enabled clients 116, 118, and 120 using geographic location data, such as, for example, GPS coordinates, received by server 108 from GPS transceiver technology in geolocation-enabled clients 116, 118, and 120. However, it should be noted that geolocation-enabled clients 116, 118, and 120 may utilize other localization technologies, such as, for example, Bluetooth Low Energy Beacon, Wireless-Fidelity, Ultra-Wideband, Long Range Radio, Radio Frequency Identification, and the like, to transmit geographic location data to server 108. Users of geolocation-enabled clients 116, 118, and 120 may utilize geolocation-enabled clients 116, 118, and 120 to view and purchase the personalized images generated by server 108. In this example, geolocation-enabled clients 116, 118, and 120 are shown as smart phones with wireless communication links to network 102. However, it should be noted geolocation-enabled clients 116, 118, and 120 may represent other types of mobile data processing systems, such as, for example, smart watches, handheld computers, cellular phones, personal digital assistants, mobile gaming devices, and the like, with wireless communication links to network 102. In addition, geolocation-enabled clients 116, 118, and 120 may represent wearable locator tags or devices that are capable of transmitting wireless signals of geographic location data.

Storage 112 also may store other types of data, such as, for example, registration information corresponding to geolocation-enabled clients 116, 118, and 120 and their respective users, image fee schedules, user payment information, post-processed images, coordinates of different sectors within the coverage area, UAV flight plans, and the like. Further, storage 112 may store authentication or credential data that may include user names, passwords, and biometric data associated with client device users and system administrators, for example.

In addition, it should be noted that network data processing system 100 may include any number of geolocation-enabled client devices and other devices not shown. Program code located in network data processing system 100 may be stored on a computer readable storage medium and downloaded to a computer or other data processing device for use. For example, program code may be stored on a computer readable storage medium on server 108 and downloaded to geolocation-enabled client 116 over network 102 for use on geolocation-enabled client 116.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 108 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores image manager 218. However, it should be noted that even though image manager 218 is illustrated as residing in persistent storage 208, in an alternative illustrative embodiment image manager 218 may be a separate component of data processing system 200. For example, image manager 218 may be a hardware component coupled to communication fabric 202 or a combination of hardware and software components. In another alternative illustrative embodiment, a first portion of image manager 218 may be located on data processing system 200 and a second portion of image manager 218 may be located on a second data processing system, such as, geolocation-enabled client 116 in FIG. 1. In yet another alternative illustrative embodiment, image manager 218 may be located in the geolocation-enabled client instead of, or in addition to, data processing system 200.

Image manager 218 controls the process of generating personalized images for people in a coverage area by redacting unwanted people and objects, which are not associated with the people, from the images and replacing redacted portions of the images with stored background images corresponding to the same geographic location, lighting conditions, weather conditions, season, camera angle, focus, and the like. UAV 220 represents identification and specification information corresponding to a UAV, such as UAV 106 in FIG. 1. Image manager 218 utilizes the identification and specification information to access and control the operation of the UAV represented by UAV 220.

360-degree panoramic camera 222 represents identification and specification information corresponding to a 360-degree panoramic camera, such as 360-degree panoramic camera 114 in FIG. 1. Image manager 218 utilizes the identification and specification information to access and control the operation of the 360-degree panoramic camera represented by 360-degree panoramic camera 222 and to obtain images, such as photographs and/or videos, captured by the 360-degree panoramic camera.

Coverage area 226 represents information defining the area where the UAV is to operate within and where the 360-degree panoramic camera is to capture images. Coverage area 226 may be, for example, a historical site, such as a monument, a tourist location, such as a theme park, a sport stadium, a national park, and the like. In addition, coverage area 226 may be a large indoor environment, such as, for example, a building's atrium or a glass-enclosed multistory structure with a walkway rising along the inner surface of the glass structure and central courtyard. Flight plan 228 represents information regarding a pre-programmed or pre-selected flight plan for the UAV over the coverage area. Image manager 218 utilizes flight plan 228 to direct the UAV as to where the UAV should fly and at what altitude.

Geolocation-enabled client devices 230 represent identification and registration information corresponding to mobile geolocation-enabled client devices, such as geolocation-enabled clients 116, 118, and 120 in FIG. 1, operating within the coverage area. Geographic location data 232 represents information corresponding to the indoor or outdoor geographic location of each mobile geolocation-enabled client device represented by geolocation-enabled client devices 230. Image manager 218 utilizes geographic location data 232 to identify the exact geographic location of each person in group members 234, who are associated with a respective mobile geolocation-enabled client device, during image capture by the 360-degree panoramic camera. Group members 234 represent information regarding people associated with a particular group. A group may be one person or may be a set of two or more people. A group also may include animals and inanimate objects, such as baby strollers.

Images 236 represent current images of group members captured by the 360-degree panoramic camera over the coverage area. Background images 238 represent previously captured and stored clean images of the coverage area. Redacted images 240 represent post-processed images that have unwanted people and objects removed by image manager 218. In addition, image manager 218 utilizes background images 240 to replace or complement the redacted portions of the final personalized images. Image manager 218 then provides the final personalized images to respective group members on corresponding geolocation-enabled client devices.

Communications unit 210, in this example, provides for communication with other computers, data processing systems, and devices, such as UAVs, 360-degree panoramic cameras, and geolocation-enabled clients, via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In today's "individual society", which also includes the "selfie-culture", many people are no longer satisfied by a postcard from a souvenir kiosk as a memento. Much more appealing to these people is a spectacular selfie (e.g., photograph or video) on which they are captured either alone or with other companions. However, sometimes a person's smartphone is not available (e.g., low battery, low memory, or not with the person) for capturing a desired selfie or all of the people desired to be captured in a selfie are too far apart. In addition, a person may not want to continuously take selfies over an extended period of time. Further, the person also may want unknown individuals and other unwanted objects, such as scaffolding, litter, graffiti, and the like, redacted or removed from the selfie in order to keep these unknown individuals and unwanted objects from interfering with the idyllic, spectacular, or unique personal moment.

Illustrative embodiments identify people and objects that belong together in a same group and that are in motion even if these people and objects in the group are not situated together or if unknown people randomly mingle with the group. According to current trends, people portrayed in images want these images published as soon as possible via social media platforms either privately or publicly. Since there is competition regarding selfies, as many people as possible must be able to benefit from these unique images as quickly as possible to maintain the competitiveness of a social media service, which is beneficial to the service provider as well.

Further, movie companies want to film scenes during peak times in places where only actors and extras should be visible in the scene. In the case of 360-degree aerial photography, in which scene footage is taken simultaneously from different angles on the ground, the film staff should not be visible in the scene. Using illustrative embodiments, these movie companies do not have to close highly-visited tourist attractions, such as historic public squares, and, thus, prevent unnecessary frustration by tourists who may have traveled from far away to these locations during filming activities.

Illustrative embodiments utilize a 360-degree panoramic camera mounted on an unmanned vehicle, such as an Unmanned Aerial Vehicle (UAV) or an Unmanned Ground Vehicle (UGV), to supply the raw image data for further processing of unique recordings. For legal and supervised use of Unmanned Aerial Vehicles (UAVs), the application of illustrative embodiments take into consideration and address various objectives: 1) consumers can get spectacular images (e.g., photographs and/or videos) customized to their preferences without carrying expensive equipment, breaking the law, or getting unwanted glances from people who feel disturbed or violated; 2) law enforcement is improved because illustrative embodiments reduce impetus to break the law; and 3) an enterprise or organization authorized to operate illustrative embodiments using UAVs can satisfy a rapidly growing demand for aerial images within a coverage area and generate additional revenue at the same time.

Illustrative embodiments may be utilized at a wide variety of sites and events that are subject to strict legal regulations, such as, for example, monuments, historical sites, religious sites, indoor or outdoor sports facilities, museums, fairgrounds, parades, firework displays, and the like. The 360-degree panoramic camera mounted on a flying UAV constantly takes 360-degree panoramic videos, as well as still photographs, of a coverage area. On the ground within the coverage area, independent individuals or groups of people are located in a predefined sector of the coverage area around the UAV according to one illustrative embodiment. According to another illustrative embodiment members of a group of people may be standing on different floors behind windows of a multistory building and the UAV is flying according to its predefined flight plan (e.g., up and down) in an inner courtyard of the multistory building. Illustrative embodiments process the image data for each independent individual or group of people by automatically redacting or removing persons and objects within the predefined sector unrelated (i.e., not associated with) the individual or the group of people with a seamless retouch. Illustrative embodiments perform the seamless retouch of the image data by applying deep learning and a pre-recorded, interference-free background image of the predefined sector. Illustrative embodiments know the geographic coordinates of each predefined sector within the coverage area, the position of the 360-degree panoramic camera, and the parameters or specifications of the 360-degree panoramic camera lens. In addition, illustrative embodiments have access to the pre-recorded, interference-free background images in a storage device.

Illustrative embodiments may redact or remove a variety of objects, such as, for example, unknown people, shadows, unwanted animals, litter, graffiti, construction equipment, and the like, from an image even if several people and objects, which are not located close together in the same sector, are to remain in the final redacted image. In other words, the people and objects that are to be included in the final image may freely move about (e.g., walk, run, jump, and the like) within the sector without risk of being excluded from the final image. This means that the people and objects to be removed from the final image are completely invisible after processing. To achieve this, illustrative embodiments replace areas in the image to be masked or redacted with clean, pre-recorded background image fragments. The background image was previously captured from the same position, angle, lens, and resolution. Illustrative embodiments balance color differences, contrasts, saturations, shades, and the like in redacted images using deep learning methods.

According to other illustrative embodiments, before entering a coverage area, a primary member of a group of one or more members is equipped with a mobile geolocation-enabled tracking device that plays a primary tracking device role. Each remaining member of the group (e.g., person, animal, or object, such as a baby stroller) also is equipped with a mobile geolocation-enabled tracking device that acts as a secondary tracking device to the primary tracking device. As a result, illustrative embodiments are able to automatically determine the current geographic location of each member of the group even if non-members exist in the coverage area that are not part of the group. During post-processing of the image data, illustrative embodiments may remove unwanted and disturbing elements from the final image in such a way that these elements are not visible in the final image. Moreover, illustrative embodiments also may complement or replace portions of group members and surrounding background that were hidden by the removed elements based on recorded geographic location data corresponding to the group members and analysis of the image data. This process works even if some group members are far from the rest of the group. Thus, illustrative embodiments leave all living and inanimate objects carrying a mobile geolocation-enabled tracking device corresponding to a defined group of members and remove all unrelated and unwanted objects from the final 360-degree panoramic image.

It should be noted that illustrative embodiments are utilized by registered or licensed service companies or organizations that operate the UAV capturing the images over coverage areas. For example, the authorized service places a UAV garage for the UAV at a suitable location, such as in the center of the coverage area. When idle, the UAV is parked in the UAV garage. The UAV garage not only protects the UAV against vandalism, but also is able to charge the energy storage (e.g., battery, hydrogen tank, and the like) of the UAV and any attached device, such as the 360-degree panoramic camera. In addition, the UAV garage may be a part of an image data center. The image data center may be equipped with a server computer, a network storage device, a heating, ventilation, and air conditioning unit, and secure network access, for example. The secure network access may provide, for example: 1) secure communication with a ticketing system; 2) secure streaming of images to a remote cloud environment or to smart devices, such as smart phones or smart watches, located in the coverage area; 3) secure streaming of images to social media platforms; 4) secure status monitoring of the image data center, the UAV, and the 360-degree panoramic camera; and 5) secure remote maintenance activities, such as program updates and upgrades.

The UAV garage automatically releases the UAV during operational hours of the coverage area or when people want the 360-degree panoramic camera to capture images (e.g., photographs, videos, and the like) of them and the environment within the coverage area. To provide motion-free shooting by the 360-degree panoramic camera even during windy conditions, the 360-degree panoramic camera is mounted on a three-dimensional gimbal, which is attached to the UAV. The UAV flies according to a predefined or preselected flight path (e.g., vertically up and down from the UAV garage, in a spiral upward and downward to and from the UAV garage, in a circle around a defined group of people, and the like) up to a predetermined altitude.

However, in the final images (i.e., photographs and/or videos) only wanted or desired individuals or cohesive groups of people are visible. During post-processing of the image data, illustrative embodiments automatically remove people and objects (e.g., people without a purchased ticket, unrelated people, litter, graffiti, parked or moving cars, advertising banners, people with closed eyes, people making improper gestures, and the like) who or which disturb the image. Illustrative embodiments replace or complement the removed free areas within the images with a pre-recorded flawless background image. This flawless background image was captured at a time when nothing was between the 360-degree panoramic camera and the background (e.g., scaffolding). These flawless background images may be captured outside of the operational hours of the coverage area during different seasons of the year and under different lighting and weather conditions. During the post-processing, illustrative embodiments automatically replace or complement the removed free areas with appropriate portions of pre-recorded season and lighting images that match the current image.

Illustrative embodiments may increase several times image output per unit time because illustrative embodiments may concurrently capture separate images in parallel as opposed to a photo booth, for example. Thus, illustrative embodiments may increase revenue and decrease waiting time. Even during peak hours when the coverage area is crowded with a multitude of people and objects, a purchaser can acquire an image of the coverage area that will lead a viewer of the image to believe that a particular person or group was alone in the coverage area at the time the image was captured. Furthermore, illustrative embodiments may protect right of privacy and right of distribution because illustrative embodiments may remove or redact people who are incidentally captured in an image of the coverage area. Moreover, purchasers can acquire unique images of the coverage area without breaking any unmanned vehicle regulations or laws.

In addition, illustrative embodiments may allow people to purchase images of the coverage area from a particular vantage point, such as, for example, atop a tower or monument within the coverage area, even when they are unable or unwilling to reach that particular vantage point because of physical handicap, vertigo, long waiting line and insufficient time to reach that particular vantage point, preference to spend the money on the purchase of the images providing an unforgettable, exclusive memory that can be shared with others as opposed to spending the money on purchasing an admission ticket to get to that particular vantage point, or that particular vantage point is not currently accessible due to construction, for example.

Illustrative embodiments may provide people with two basic approaches as to how they wish to utilize the services provided by the different illustrative embodiments. A first approach is for people to select beforehand from a menu as to what images they want and pay upfront. In this first approach, an individual person or a group of associated people, with or without animals (e.g., dogs), purchase a ticket for a specific image session. The person or group may purchase the ticket via a mobile application on a smart phone, a ticket machine, or at a ticket counter on site, for example. Due to receipt of location-based data (e.g., GPS coordinates) from geolocation-enabled mobile devices carried by the person or each group member, illustrative embodiments are capable of exactly identifying the geographic location of the person or each group member. Alternatively, different illustrative embodiments may utilize facial and/or full-body recognition methods to identify the geographic location of the person or each group member. Illustrative embodiments also may finetune the location of people either via visual directions, which may be comparable to direction arrows in an automatic car wash, or via verbal directions using audio output devices, such as, for example, ultrasound-based speakers, within assigned sectors of the coverage area. The goal of this finetuning activity is to make sure that the person or group is not obscured by other unrelated purchasers during the image capturing process. In addition, purchasers are free to position themselves as they wish.

A second approach is before people pay anything, the people are captured in images starting when they first enter the coverage area. In this second approach, the people decide after viewing post-processed final images as to whether to purchase any of the images. In this second approach, a person receives a mobile geolocation-enabled tracking device (e.g., Bluetooth Low Energy beacon, active ultra-high frequency RFID tag, device with GPS/INS, GLONASS, Ultra-Wideband, Long Range Radio, or the like component) as a loaner at the entrance to the coverage area. In the case of a group, such as a family or a tour group, a primary member of the family or a tour guide purchases tickets for everyone in the group. Illustrative embodiments assign a primary device role to the purchaser's geolocation-enabled tracking device and assign a secondary device role to remaining geolocation-enabled tracking devices corresponding to other members of the group. This way, illustrative embodiments can constantly detect the location of each person. Further, illustrative embodiments are capable of recognizing each member of a particular group by the primary/secondary device role relationship even if there are unrelated people (i.e., people not associated with the group) mingling with the group in the coverage area.

When the person or group leaves the coverage area or possibly before leaving the coverage area, the service provider provides the person or group with an opportunity to view and possibly purchase personally-customized final images of the person or group. Of course, only the person or group who purchased the personally-customized final images are visible in the images.

Based on the image data, illustrative embodiments mark the contours and shadows of each person or group member and corresponding objects, such as baby strollers and animals, captured during the predefined or preselected flight path of the UAV to remove all unrelated people inside and outside different sectors of the coverage area. Illustrative embodiments perform this fully automatic, intelligent image processing utilizing deep learning methods depending on available computational power, network bandwidth, and storage capacity of the local image data center or partially in a remote cloud-based computer.

Illustrative embodiments utilize the deep learning methods to determine, for example, technical quality of the images. The technical quality of the images may include, for example, focus, blurriness, illumination, contrast, high-fidelity, high retouch/remove quality, low rate of removed image sequences due to a low number of objects that conceal potential purchasers, and the like. In addition, illustrative embodiments may utilize deep learning methods to determine the emotional quality of images. The emotional quality of images may include, for example, portrait quality of the images (e.g., full face visible, eyes open, smiling, and the like), visibility (e.g., distant mountains in background, bright day versus misty, foggy, or rainy day, and the like), shadow length and shade of colors (e.g., early morning as opposed to noontime or sunset), appearance of natural phenomenon (e.g., rainbow, lightning, dramatic clouds, dramatic sunrise or sunset, solar eclipse, and the like), or occurrence of special events (e.g., fireworks, blimp, military jet squadron flyby, parade, parachutists, and the like).

Illustrative embodiments may perform image processing by, for example, automatic replacement of an area or areas inside redact markings with a clean background that has been pre-recorded and processed from the same position, with the same focal length and camera angle. Illustrative embodiments select a pre-recorded background that is as close as possible to the current season, weather conditions, and lighting conditions. Alternatively, during the ordering phase, a purchaser may select a particular background from a menu of backgrounds. This selected background can be from a different time of day (e.g., possibly outside the operational hours of the coverage area) or from a time when weather and/or lighting conditions were better. It should be noted that illustrative embodiments perform this image processing "x" number of times for "y" number of sectors in the coverage area based on the same image data.

If body parts of a person or corresponding objects are hidden by unknown people or objects during image capture, then illustrative embodiments use deep learning methods to reconstruct and replace the hidden portions of the person or corresponding objects by searching for other images captured before and after the image when the hidden portions are visible in a captured image. The reconstruction of the hidden parts varies depending on the changing position of the UAV and the person or object affected. If reconstruction is not possible or is of insufficient quality, then illustrative embodiments will not use that image.

With reference now to FIG. 3, a diagram illustrating an example of an image management system is depicted in accordance with an illustrative embodiment. Image management system 300 may be implemented in a network of data processing systems, such as network data processing system 100 in FIG. 1. Image management system 300 is a system of hardware and software components for selectively redacting, based on the tracked current location of each member of a group within a coverage area, at least one of the non-group members from images of the coverage area such that group members are clearly shown in redacted images and privacy rights of the least one of the non-group members are protected. It should be noted that in some cases image management system 300 may not redact all non-group members from images of the coverage area. For example, image management system 300 may not redact non-group members who are far enough away that privacy rights are protected without redaction, non-group members who are vendors in the coverage area who have previously given permission to be included in all captured images of the coverage area, and the like.

In this example, image management system 300 includes server 302, UAV with 360-degree panoramic camera 304, and geolocation-enabled mobile client device 306. However, it should be noted that image management system 300 is intended as an example only and not as a limitation on illustrative embodiments. In other words, image management system 300 may include any number of servers, UAVs with 360-degree panoramic cameras, geolocation-enabled mobile client devices, and other data processing systems not shown.

Server 302 may be, for example, server 108 in FIG. 1 or data processing system 200 in FIG. 2. Server 302 controls UAV with 360-degree panoramic camera 304 and processes image data obtained from UAV with 360-degree panoramic camera 304. UAV with 360-degree panoramic camera 304 may be, for example, UAV 106 with 360-degree panoramic camera 114 in FIG. 1. The image data may be, for example, images 236 in FIG. 2. The image data may be of, for example, a person, such as the individual corresponding to geolocation-enabled mobile client device 306, within coverage area 308. Geolocation-enabled mobile client device 306 may be, for example, geolocation-enabled client 116 in FIG. 1.

Geolocation-enabled mobile client device 306 may utilize, for example, GPS satellite 310, to receive geographic location data, such as GPS coordinates, corresponding to geolocation-enabled mobile client device 306. Geolocation-enabled mobile client device 306 then may transmit the geographic location data to server 302. Using the received geographic location data, server 302 determines the exact geographic location of the person corresponding to geolocation-enabled mobile client device 306 within coverage area 308 during image capture by UAV with 360-degree panoramic camera 304.

Server 302 also takes into consideration conditions, such as, for example, weather conditions 312, when post-processing images to determine the appropriate background images from a set of stored background images, such as background images 238 in FIG. 2, to incorporate into the final images. In addition, server 302 is coupled to energy and internet connections 314 for energy requirements and for network connections to UAV with 360-degree panoramic camera 304, geolocation-enabled mobile client device 306, and other data processing systems and devices.

Figure 4:
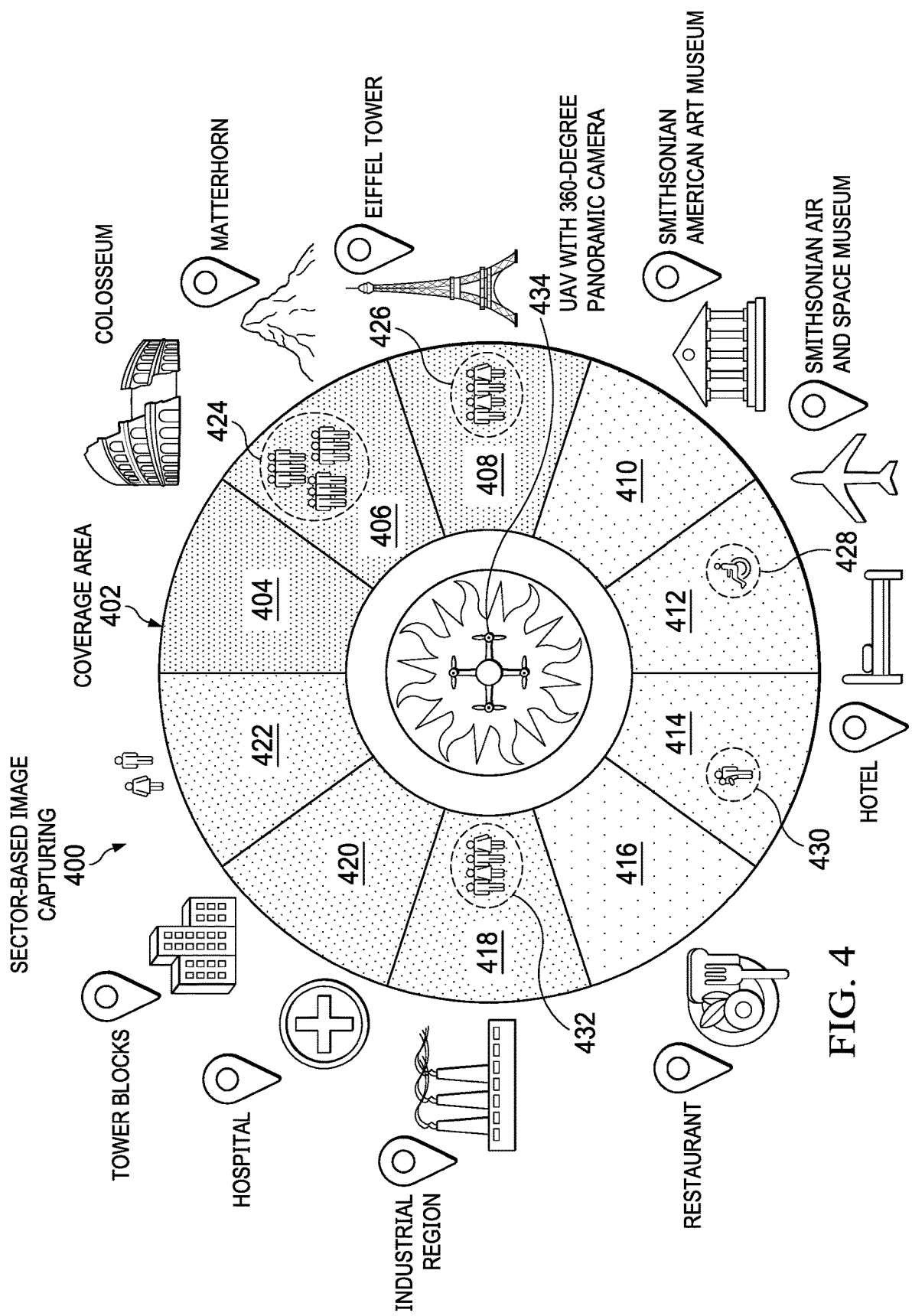
FIG. 4 is a diagram illustrating an example of sector-based image capturing in accordance with an illustrative embodiment.

With reference now to FIG. 4, a diagram illustrating an example of sector-based image capturing is depicted in accordance with an illustrative embodiment. Sector-based image capturing 400 is the process of capturing images by sector within coverage area 402. In this example, coverage area 402 includes sector 404, sector 406, sector 408, sector 410, sector 412, sector 414, sector 416, sector 418, sector 420, and sector 422. However, it should be noted that coverage area 402 is intended as an example only and may include any number of sectors (i.e., more or fewer sectors than illustrated).

Also in this example, group 424 is located in sector 406, group 426 is located in sector 408, group 428 is located in sector 412, group 430 is located in sector 414, and group 432 is located in sector 418. UAV with 360-degree panoramic camera 434 captures images of group 424 in sector 406, group 426 in sector 408, group 428 in sector 412, group 430 in sector 414, and group 432 in sector 418 in coverage area 402 concurrently. UAV with 360-degree panoramic camera 434 sends the captured images to a server, such as server 302 in FIG. 3, for processing and generation of personalized final images for each of the different groups.

Figure 5:
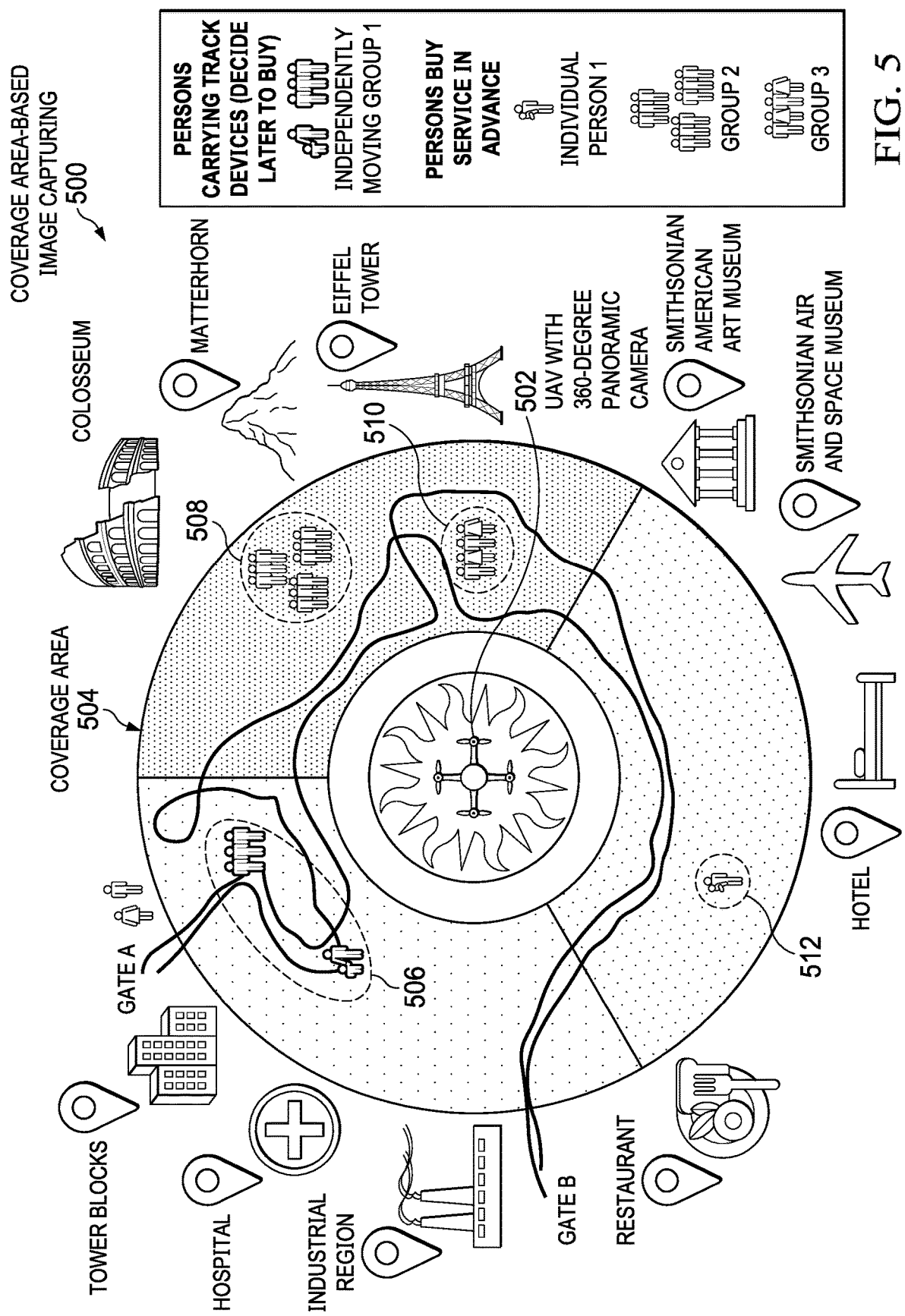
FIG. 5 is a diagram illustrating an example of coverage area-based image capturing in accordance with an illustrative embodiment.

With reference now to FIG. 5, a diagram illustrating an example of coverage area-based image capturing is depicted in accordance with an illustrative embodiment. In the example of coverage area-based image capturing 500, UAV with 360-degree panoramic camera 502 continuously, or at predetermined time intervals, captures images of independently moving group 1 506 as group 1 506 independently moves throughout coverage area 504 from gate A to gate B. Coverage area 504 also includes group 2 508, group 3 510, and group 4 512, which is an individual person. UAV with 360-degree panoramic camera 502 also may capture images of these other groups as they move within coverage area 504.

Figure 6:
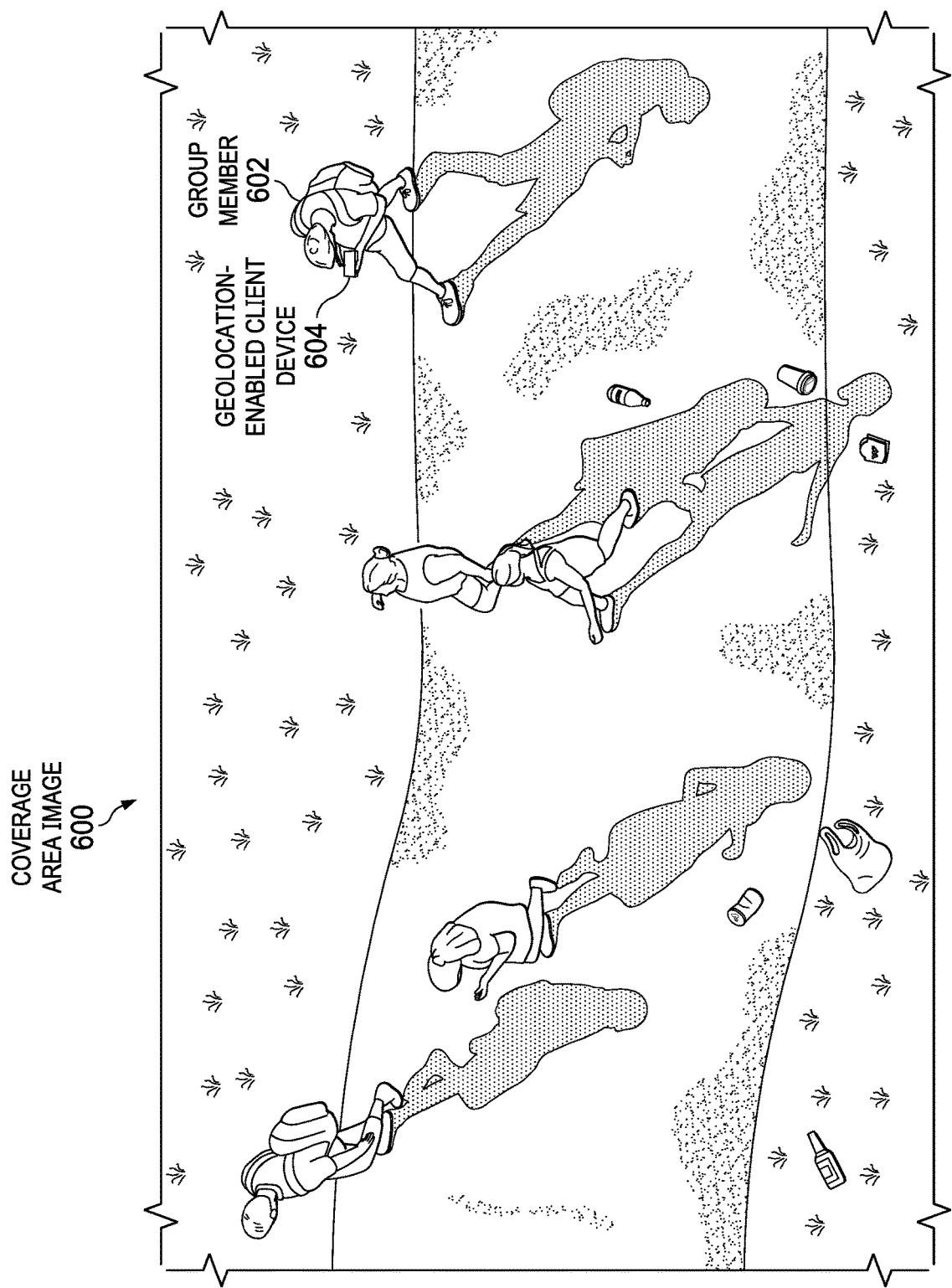
FIG. 6 is an illustration of an example image captured in a coverage area in accordance with an illustrative embodiment.

With reference now to FIG. 6, an illustration of an example image captured in a coverage area is depicted in accordance with an illustrative embodiment. Coverage area image 600 is an image of group member 602, who is carrying geolocation-enabled client device 604, within the coverage area, such as coverage area 504 in FIG. 5. Group member 602 may be, for example, group 4 512 in FIG. 5. Unfortunately for group member 602, other unwanted and unrelated people and objects, such as litter, are captured in coverage area image 600.

Figure 7:
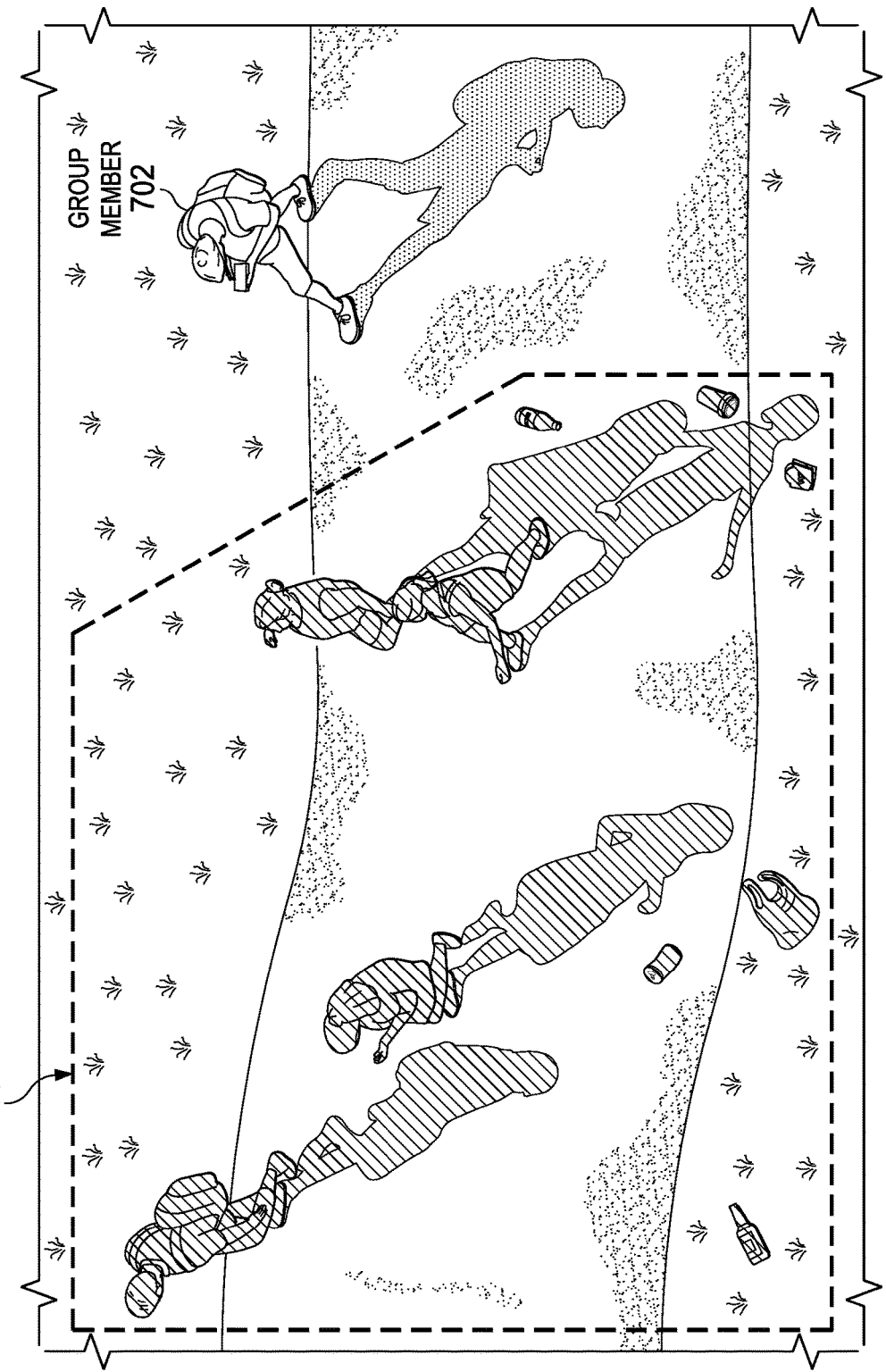
FIG. 7 is an example illustration of identified and marked unrelated people and objects to redact from the coverage area image shown in the example of FIG. 6 in accordance with an illustrative embodiment.

With reference now to FIG. 7, an example illustration of identified and marked unrelated people and objects to redact from the coverage area image shown in the example of FIG. 6 is depicted in accordance with an illustrative embodiment. Identified and marked unrelated people and objects to redact from coverage area image 700 shows the unrelated and unwanted people and objects identified and marked by an image manager, such as image manager 218 in FIG. 2, to be removed from the image of the coverage area that includes group member 702. It should be noted that group member 702 is the same as group member 602 in FIG. 6.

Figure 8:
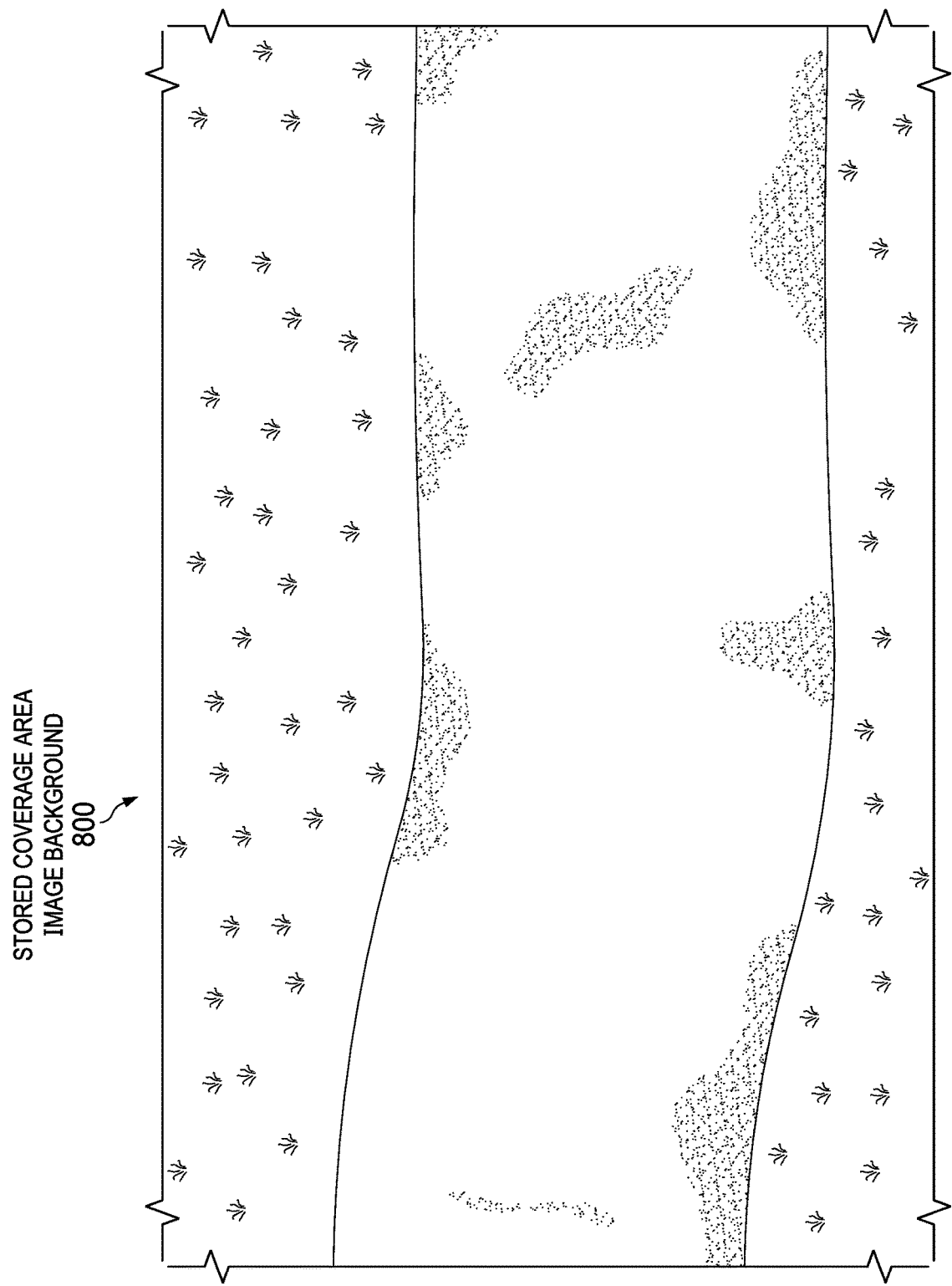
FIG. 8 is an example illustration of a stored background corresponding to the coverage area image shown in the example of FIG. 6 in accordance with an illustrative embodiment.

With reference now to FIG. 8, an example illustration of a stored background corresponding to the coverage area image shown in the example of FIG. 6 is depicted in accordance with an illustrative embodiment. Stored coverage area image background 800 is a pre-recorded, interference free background image having, for example, the same or similar lighting conditions, weather conditions, season, and camera angle of the coverage area. An image manager, such as image manager 218 in FIG. 2, utilizes stored coverage area image background 800 to replace redacted portions of an image, such as identified and marked unrelated people and objects to redact from coverage area image 700.

Figure 9:
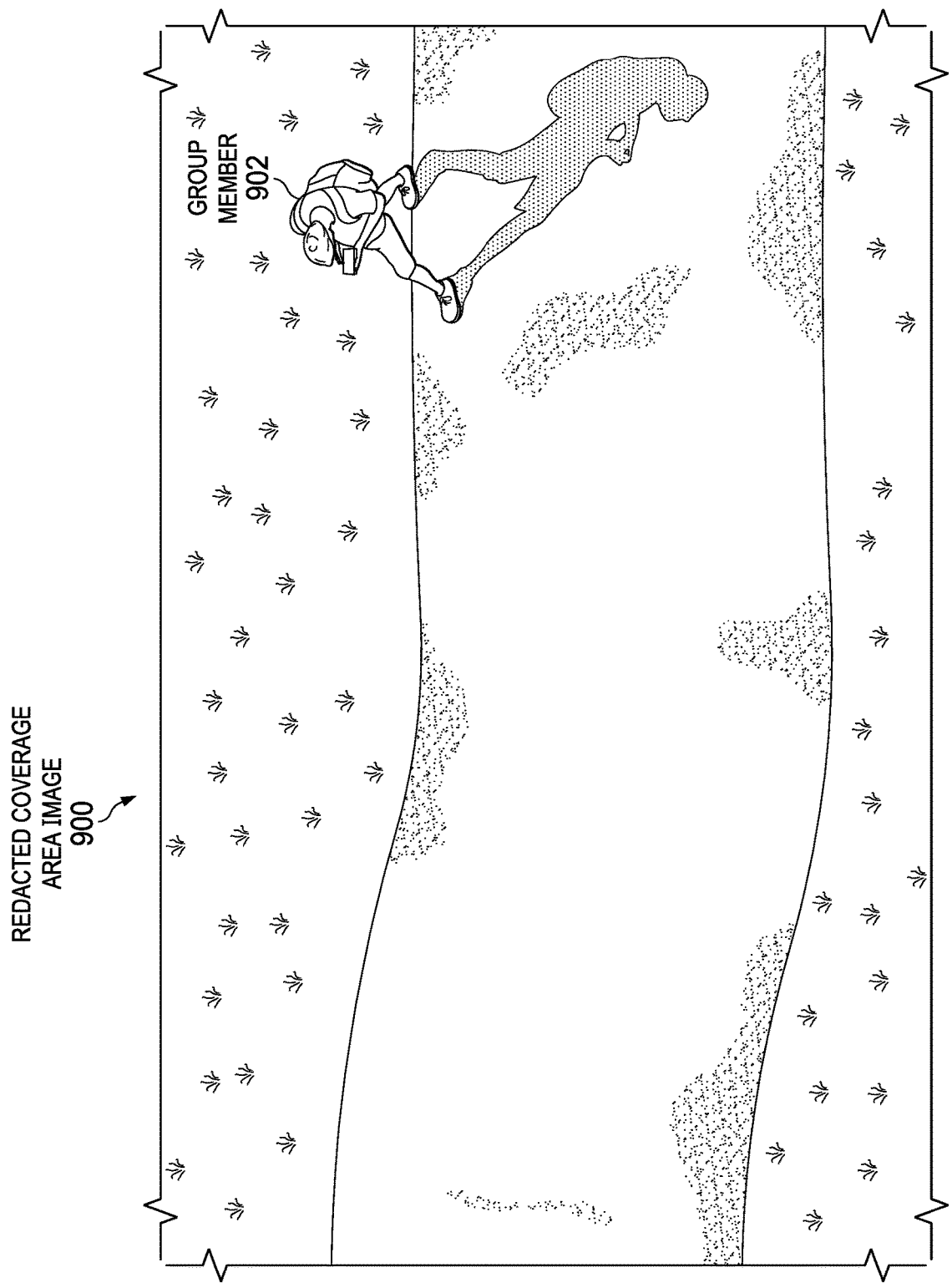
FIG. 9 is an example illustration of a redacted image corresponding to the coverage area image shown in the example of FIG. 6 in accordance with an illustrative embodiment.

With reference now to FIG. 9, an example illustration of a redacted image corresponding to the coverage area image shown in the example of FIG. 6 is depicted in accordance with an illustrative embodiment. Redacted coverage area image 900 is a final customized image for group member 902 with the redacted portions replaced with a stored background image, such as stored coverage area image background 800 in FIG. 8. It should be noted that group member 902 is the same as group member 602 in FIG. 6 and group member 702 in FIG. 7.

Figure 10:
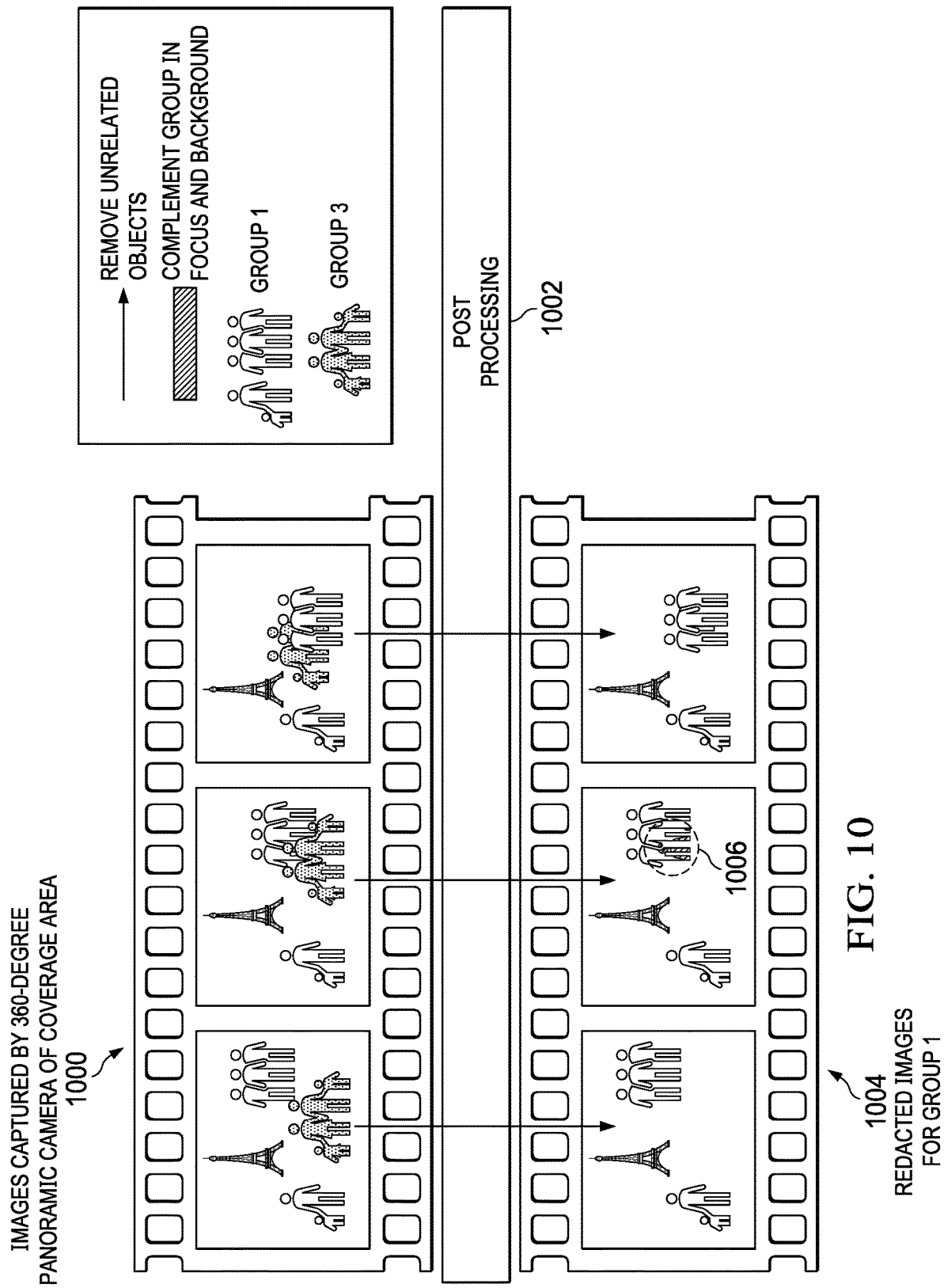
FIG. 10 is a diagram illustrating an example of complementing hidden portions of group members of interest within an image in accordance with an illustrative embodiment.

With reference now to FIG. 10, a diagram illustrating an example of complementing hidden portions of group members of interest within an image is depicted in accordance with an illustrative embodiment. Images captured by 360-degree panoramic camera of coverage area 1000 represent a series of images taken of a coverage area that includes two groups of people, group 1 and group 3, and a tourist attraction in the background. An image manager, such as image manager 218 in FIG. 2, performs post-processing 1002 on images captured by 360-degree panoramic camera of coverage area 1000. In this example, during post-processing 1002, the image manager redacts or removes group 3 from the series of images to generate redacted images for group 1 1004. Further during post-processing 1002, the image manager complements the portions of group 1 that were previously hidden by members of redacted group 3 as shown at 1006.

Figure 11:
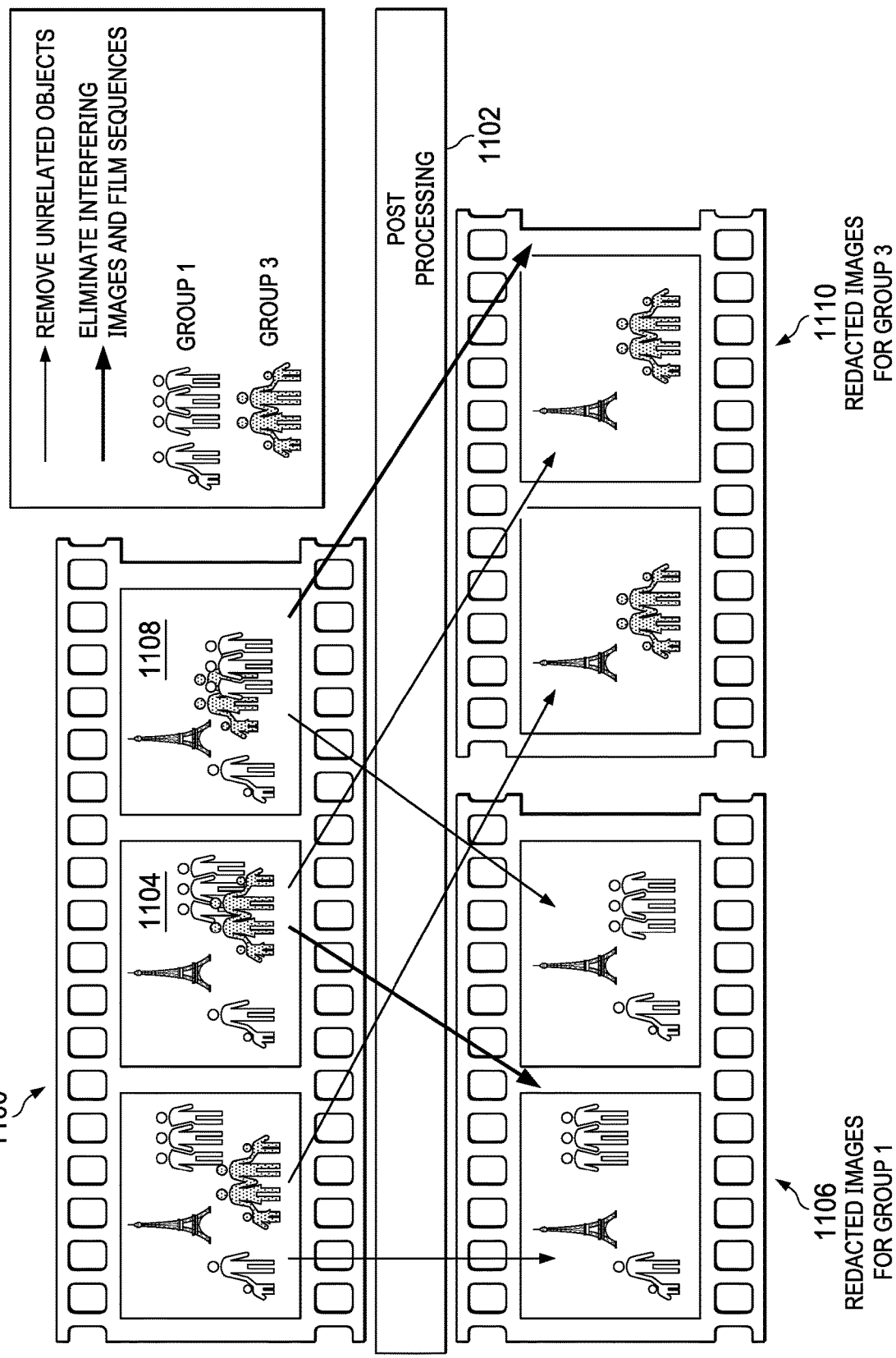
FIG. 11 is a diagram illustrating an example of eliminating image frames having a level of interference above a threshold level of interference in accordance with an illustrative embodiment.

With reference now to FIG. 11, a diagram illustrating an example of eliminating image frames having a level of interference above a threshold level of interference is depicted in accordance with an illustrative embodiment. Images captured by 360-degree panoramic camera of coverage area 1100 represent a series of images taken of a coverage area that includes two groups of people, group 1 and group 3, and a tourist attraction in the background. An image manager, such as image manager 218 in FIG. 2, performs post-processing 1102 on images captured by 360-degree panoramic camera of coverage area 1100. In this example, during post-processing 1102, the image manager eliminates image 1104 having a level of interference above a threshold level of interference for group 1 and redacts group 3 from the series of images to generate redacted images for group 1 1106. Concurrently, the image manager eliminates image 1108 having a level of interference above a threshold level of interference for group 3 and redacts group 1 from the series of images to generate redacted images for group 3 1110.

Figure 12:
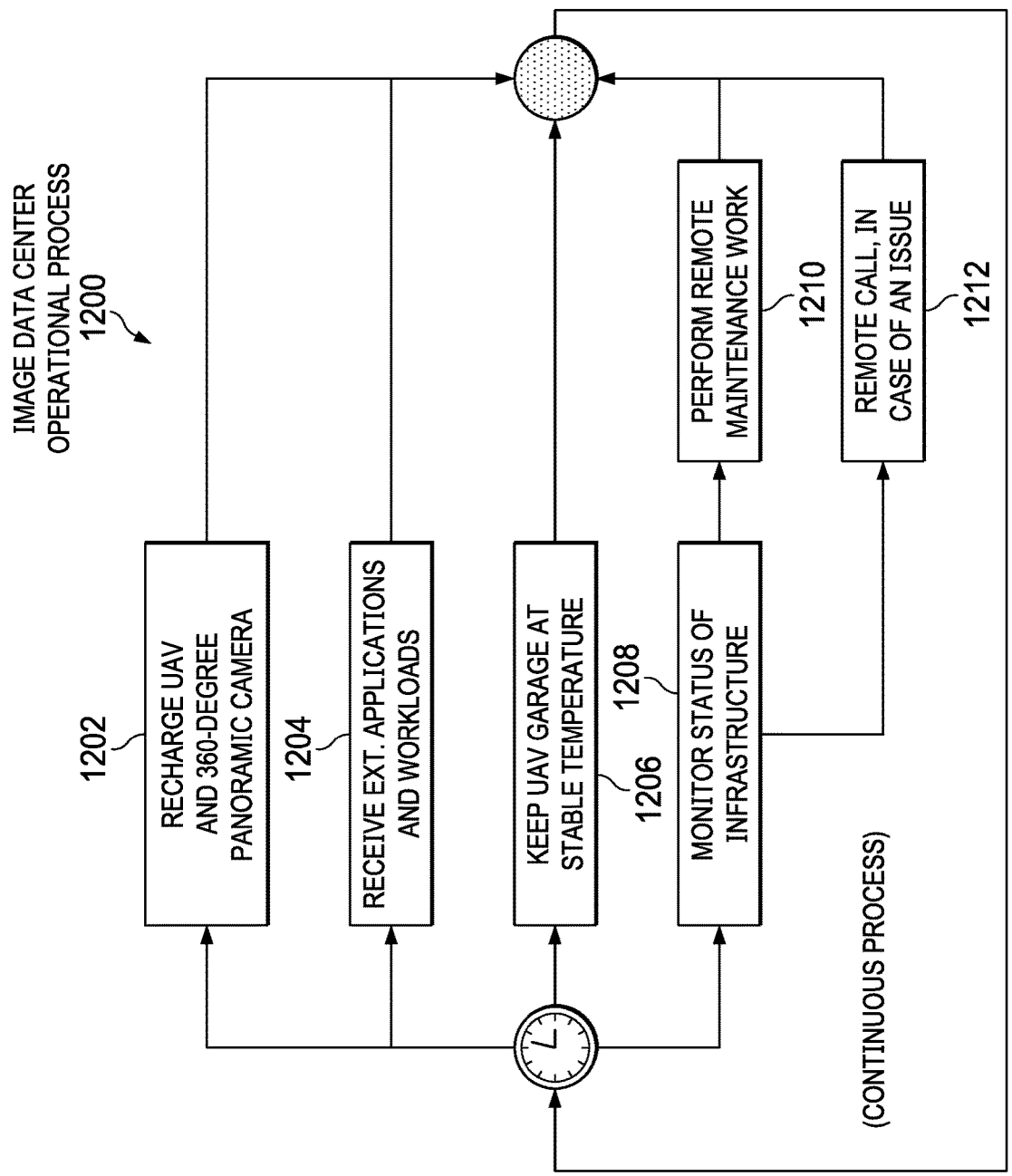
FIG. 12 is a diagram illustrating an example of an image data center operational process in accordance with an illustrative embodiment.

With reference now to FIG. 12, a diagram illustrating an example of an image data center operational process is depicted in accordance with an illustrative embodiment. Image data center operational process 1200 represents a process for operating an image data center, such as image data center 104 in FIG. 1. In this example, image data center operational process 1200 includes step 1202, step 1204, step 1206, step 1208, step 1210, and step 1212. However, it should be noted that image data center operational process 1200 is intended as an example only and may include more or fewer steps than illustrated.

At 1202, image data center operational process 1200 recharges a UAV and corresponding 360-degree panoramic camera. The UAV and corresponding 360-degree panoramic camera may be, for example, UAV 106 and corresponding 360-degree panoramic camera 114 in FIG. 1. At 1204, image data center operational process 1200 receives external applications and workloads for performing post-processing of coverage area images, such as coverage area image 600 in FIG. 6.

At 1206, image data center operational process 1200 keeps a UAV garage, such as UAV garage 110 in FIG. 1, at a stable temperature. At 1208, image data center operational process 1200 monitors a status of the infrastructure, such as, for example, the UAV, the 360-degree panoramic camera, and the server. At 1210, image data center operational process 1200 performs remote maintenance work on an infrastructure component needing maintenance as identified during monitoring step 1208. At 1212, image data center operational process 1200 executes a remote call in case of an issue that cannot be resolved during maintenance step 1210. It should be noted that image data center operational process 1200 is a continuous process.

Figure 13:
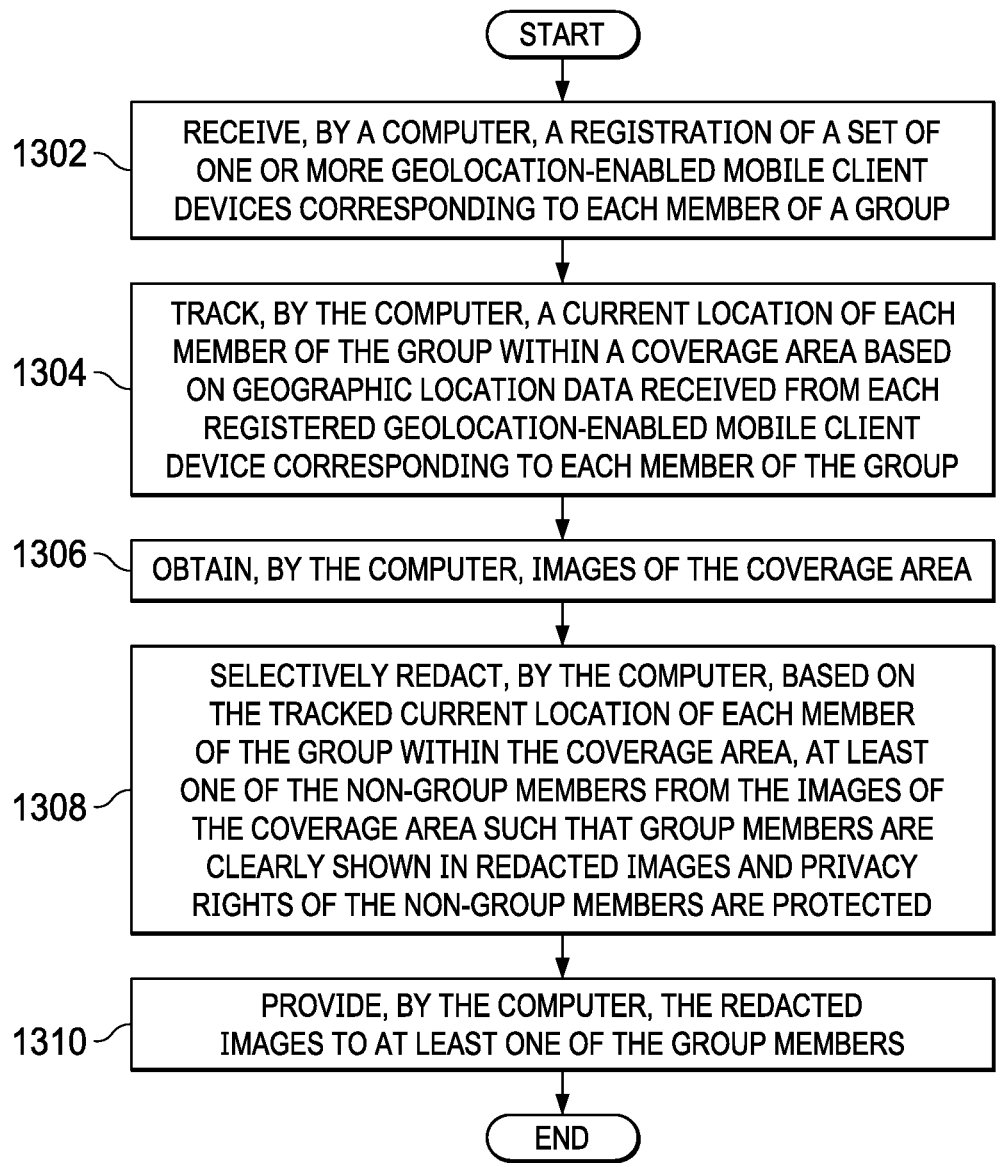
FIG. 13 is a flowchart illustrating a process for selectively redacting non-group members from images of a coverage area in accordance with an illustrative embodiment.

With reference now to FIG. 13, a flowchart illustrating a process for selectively redacting non-group members from images of a coverage area is shown in accordance with an illustrative embodiment. The process shown in FIG. 13 may be implemented in a computer, such as, for example, server 104 in FIG. 1, data processing system 200 in FIG. 2, or server 302 in FIG. 3.

The process begins when the computer receives a registration of a set of one or more geolocation-enabled mobile client devices corresponding to each member of a group (step 1302). The set of geolocation-enabled mobile client devices may be, for example, geolocation-enabled clients 116, 118, and 120 in FIG. 1. The computer tracks a current location of each member of the group within a coverage area based on geographic location data received from each registered geolocation-enabled mobile client device corresponding to each member of the group (step 1304). The coverage area may be, for example, coverage area 308 in FIG. 3, coverage area 402 in FIG. 4, or coverage area 502 in FIG. 5.

In addition, the computer obtains images of the coverage area (step 1306). The computer may obtain the images of the coverage area using a UAV with a mounted 360-degree panoramic camera wirelessly connected to the computer via a secure network connection. Further, the computer, based on the tracked current location of each member of the group within the coverage area, selectively redacts or removes at least one of the non-group members from the images of the coverage area such that group members are clearly shown in redacted images and privacy rights of the at least one of the non-group members are protected (step 1308). The computer selectively redacts the images by replacing the at least one of the non-group members with pre-recorded, interference-free background images of the coverage area retrieved from storage. It should be noted that in some cases the computer may not redact all non-group members. For example, the computer may not redact non-group members who are far enough away that privacy rights are protected without redaction, non-group members who are vendors in the coverage area who have previously given permission to be included in all captured images of the coverage area, and the like.

Afterward, the computer, provides the redacted images to at least one of the group members (step 1310). The computer may, for example, provide to the at least one of the group members only redacted images that show at least two members of the group within a predefined distance of each other. The computer may provide the redacted images to the group members via, for example, the registered geolocation-enabled mobile client devices corresponding to the group members. The registered geolocation-enabled mobile client devices corresponding to the group members may be, for example, smart phones, smart watches, handheld computers, cellular phones, or any combination thereof. Thereafter, the process terminates.

Thus, illustrative embodiments of the present invention provide a computer-implemented method, computer system, and computer program product for selectively redacting, based on the tracked current location of each member of a group within a coverage area, at least one of the non-group members from images of the coverage area such that group members are clearly shown in redacted images and privacy rights of the at least one of the non-group members are protected. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
providing high-quality images of members of a group, the members of the group moving within a coverage area, the coverage area:
comprising a geographic area; and
including non-group members in the geographic area;
wherein the high-quality images are provided by a computer:
separately tracking a current geographic location of each member of the group within the coverage area to produce a tracked current geographic location of each member of the group;
obtaining images of the coverage area;
selectively redacting based on the tracked current geographic location of each member of the group within the coverage area, at least one of the non-group members from the images of the coverage area such that the members of the group are clearly shown in redacted images and privacy rights of the at least one of the non-group members are protected;
adjusting selectively redacted images by replacing or complementing portions of people or associated objects hidden by the at least one of the non-group members in the images with stored background images corresponding to the geographic area; and
providing adjusted selectively redacted images to at least one of the members of the group.

2. The computer-implemented method of claim 1, further comprising the computer:
receiving a registration of a geolocation-enabled mobile client device corresponding to each of the members of the group.

3. The computer-implemented method of claim 2, wherein the computer tracks the current geographic location of each of the members of the group within the coverage area based on geographic location data received from each registered geolocation-enabled mobile client device corresponding to each of the members of the group.

4. The computer-implemented method of claim 3, further comprising the computer:
assigning a primary role to a registered geolocation-enabled mobile client device corresponding to a primary member of the group; and
assigning a secondary role to any registered geolocation-enabled mobile client devices corresponding to secondary members of the group.

5. The computer-implemented method of claim 1, wherein the images are selectively redacted by replacing the at least one of the non-group members with pre-recorded, interference-free background images of the coverage area.

6. The computer-implemented method of claim 1, wherein the images of the coverage area are continuously obtained from a 360-degree panoramic camera mounted on an unmanned aerial vehicle above the coverage area, wherein the coverage area corresponds to an area of operation of the unmanned aerial vehicle.

7. The computer-implemented method of claim 6, wherein the 360-degree panoramic camera is mounted on the unmanned aerial vehicle using a three-dimensional gimbal.

8. The computer-implemented method of claim 1, wherein:
multiple different groups are tracked concurrently; and
a same image is selectively redacted differently to generate a different personalized image from the same image for each different group.

9. The computer-implemented method of claim 1, wherein one or more images in a series of images having a level of interference above a threshold level of interference for the group are eliminated.

10. The computer-implemented method of claim 1, wherein deep learning is used to reconstruct and replace hidden portions of the members of the group that were hidden by redacted non-group members in an image by searching for other images captured before and after the image when hidden portions are visible in a captured image.

11. A computer system for providing high-quality images of members of a group moving within a coverage area that includes non-group members, the computer system comprising:
a bus system;
a storage device connected to the bus system, wherein the storage device stores program instructions; and
a processor connected to the bus system, wherein the processor executes the program instructions to:
independently track a current geographic location of each member of the group within the coverage area to produce a tracked current geographic location of each member of the group;
obtain images of the coverage area;
selectively redact, based on the tracked current geographic location of each member of the group within the coverage area, at least one of the non-group members from the images of the coverage area such that the members of the group are clearly shown in redacted images and privacy rights of the non-group members are protected; and
provide selectively redacted images to at least one of the members of the group.

12. The computer system of claim 11, wherein the processor further executes the program instructions to:
receive a registration of a geolocation-enabled mobile client device corresponding to each of the members of the group.

13. The computer system of claim 12, wherein the current geographic location of each of the members of the group within the coverage area is tracked based on geographic location data received from each registered geolocation-enabled mobile client device corresponding to each of the members of the group.

14. A computer program product comprising:
a computer-readable medium including instructions for providing high-quality images of members of a group moving within a coverage area that includes non-group members, the instructions comprising:
first program code for tracking a current geographic location of each member of the group within the coverage area to produce a tracked current geographic location of each member of the group;
second program code for obtaining images of the coverage area;
third program code for selectively redacting, based on the tracked current geographic location of each member of the group within the coverage area, at least one of the non-group members from the images of the coverage area such that the members of the group are clearly shown in redacted images and privacy rights of the at least one of the non-group members are protected; and fourth program code for providing selectively redacted images to at least one of the members of the group.

15. The computer program product of claim 14, wherein the instructions further comprise:

fifth program code for receiving a registration of a geolocation-enabled mobile client device corresponding to each of the members of the group.

16. The computer program product of claim 15, wherein the instructions further comprise:

sixth program code for tracking the current geographic location of each of the members of the group within the coverage area based on geographic location data received from each registered geolocation-enabled mobile client device corresponding to each of the members of the group.

17. The computer program product of claim 16, wherein the instructions further comprise:

seventh program code for assigning a primary role to a registered geolocation-enabled mobile client device corresponding to a primary member of the group; and eighth program code for assigning a secondary role to any registered geolocation-enabled mobile client devices corresponding to secondary members of the group.

18. The computer program product of claim 14, wherein the instructions further comprise:

fifth program code for selectively redacting the images by replacing the at least one of the non-group members with pre-recorded, interference-free background images of the coverage area.

19. The computer program product of claim 14, wherein the instructions further comprise:

fifth program code for continuously obtaining the images of the coverage area from a 360-degree panoramic camera mounted on an unmanned aerial vehicle above the coverage area.

20. The computer-implemented method of claim 1, wherein the stored background images are different than the images.

* * * * *